United States Patent
Soundararajan et al.

(10) Patent No.: US 12,020,033 B2
(45) Date of Patent: Jun. 25, 2024

(54) APPARATUS AND METHOD FOR HARDWARE-BASED MEMOIZATION OF FUNCTION CALLS TO REDUCE INSTRUCTION EXECUTION

(71) Applicant: Intel Corporation, Santa Clara, CA (US)

(72) Inventors: Niranjan Kumar Soundararajan, Bengaluru (IN); Sreenivas Subramoney, Bangalore (IN); Jayesh Gaur, Bangalore (IN); S R Swamy Saranam Chongala, Srikakulam (IN)

(73) Assignee: Intel Corporation, Santa Clara, CA (US)

( * ) Notice: Subject to any disclaimer, the term of this patent is extended or adjusted under 35 U.S.C. 154(b) by 669 days.

(21) Appl. No.: 17/133,899

(22) Filed: Dec. 24, 2020

(65) Prior Publication Data

US 2022/0206816 A1    Jun. 30, 2022

(51) Int. Cl.
*G06F 9/38* (2018.01)
*G06F 9/22* (2006.01)

(52) U.S. Cl.
CPC ............ *G06F 9/3836* (2013.01); *G06F 9/223* (2013.01); *G06F 9/3838* (2013.01)

(58) Field of Classification Search
CPC .................................................. G06F 9/3836
See application file for complete search history.

(56) References Cited

U.S. PATENT DOCUMENTS

| | | | |
|---|---|---|---|
| 2004/0111708 A1* | 6/2004 | Calder ................ | G06F 11/3447 717/135 |
| 2013/0024675 A1* | 1/2013 | Lovett ..................... | G06F 9/455 712/E9.045 |

OTHER PUBLICATIONS

Costa et al., "The Dynamic Trace Memoization Reuse Technique", IEEE, 2000, pp. 92-99.
Suresh et al., "Intercepting Functions for Memoization: A Case Study Using Transcendental Functions", HAL, Jul. 17, 2015, 24 pages.
Wikipedia, "x86 Calling Conventions", Available Online at <https://en.wikipedia.org/wiki/X86_calling_conventions>, Retrieved on Mar. 25, 2021, 15 pages.

* cited by examiner

*Primary Examiner* — Michael J Metzger
(74) *Attorney, Agent, or Firm* — NICHOLSON DE VOS WEBSTER & ELLIOTT LLP

(57) ABSTRACT

Apparatus and method for memorizing repeat function calls are described herein. An apparatus embodiment includes: uop buffer circuitry to identify a function for memorization based on retiring micro-operations (uops) from a processing pipeline; memorization retirement circuitry to generate a signature of the function which includes input and output data of the function; a memorization data structure to store the signature; and predictor circuitry to detect an instance of the function to be executed by the processing pipeline and to responsively exclude a first subset of uops associated with the instance from execution when a confidence level associated with the function is above a threshold. One or more instructions that are data-dependent on execution of the instance is then provided with the output data of the function from the memorization data structure.

25 Claims, 13 Drawing Sheets

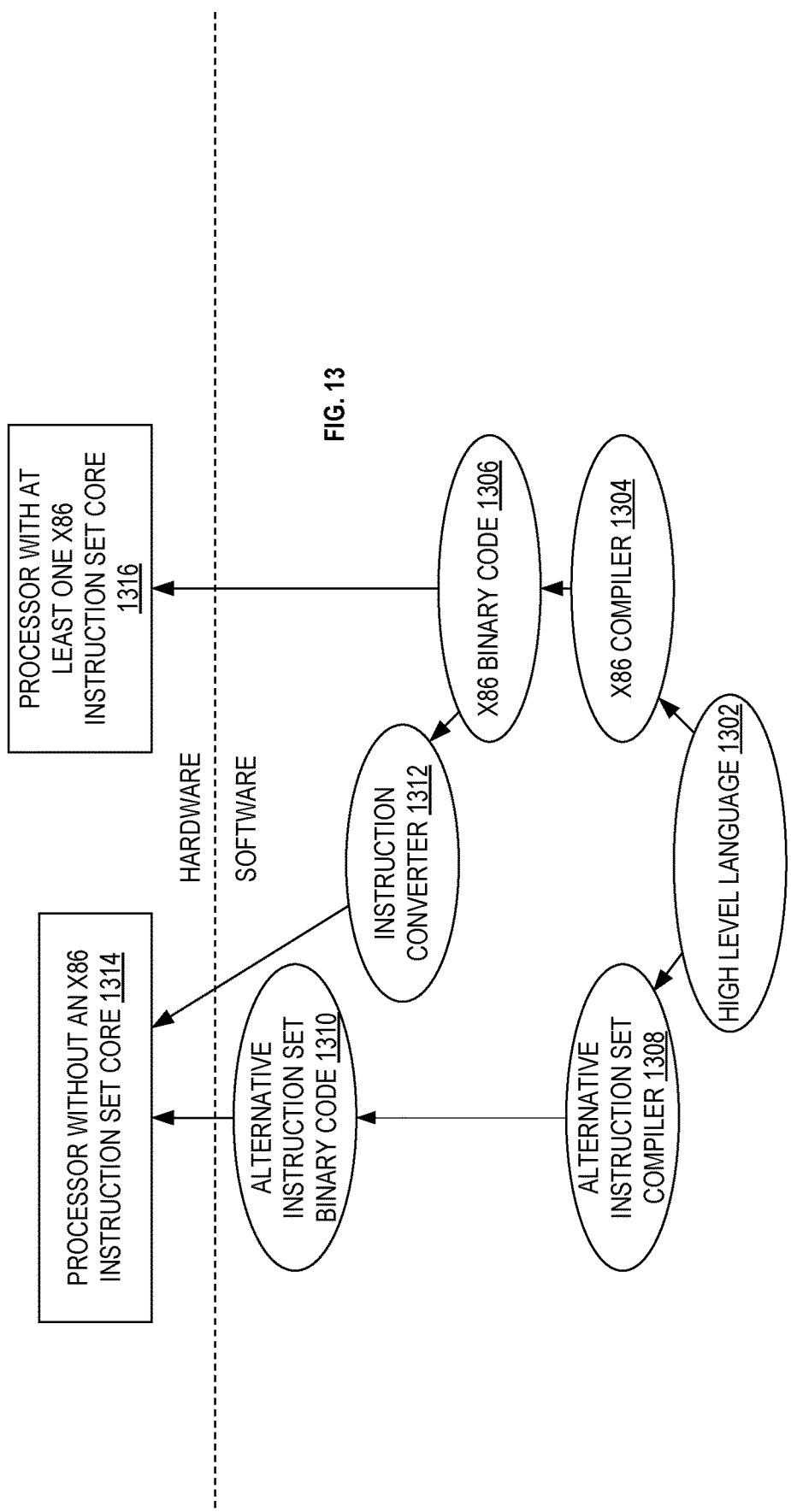

APPARATUS AND METHOD FOR HARDWARE-BASED MEMOIZATION OF FUNCTION CALLS TO REDUCE INSTRUCTION EXECUTION

TECHNICAL FIELD

Embodiments of the invention described herein relate generally to computer processor architecture. In particular, the disclosure relates to hardware-based memorization of function calls to reduce instruction execution.

BACKGROUND ART

A function call is a programming construct used in applications to accomplish a specific functionality. When a functionality is commonly used, multiple instances of the function call may often be made from different locations in an application or from different applications. Based on the input parameters, the outputs of the functions can vary. In general, however, when the same input parameters are used in a function call, the same outputs are produced. Thus, if a function's input parameters and output values are learned and captured in a table, repeated executions of the function can be avoided because the output values can simply be obtained from the table by the post-function instruction stream. The tracking of execution blocks and mimicking their execution from tables is known as memorization. Current techniques to memorize application function blocks exist only in software and tend to focus on math functions. A more robust hardware-focused solution is thus needed.

BRIEF DESCRIPTION OF THE DRAWINGS

The invention may best be understood by referring to the following description and accompanying drawings that are used to illustrate embodiments of the invention. In the drawings:

FIG. 13 illustrates a block diagram contrasting the use of a software instruction converter to convert binary instructions in a source instruction set to binary instructions in a target instruction set according to embodiments of the invention.

DETAILED DESCRIPTION

Figure 1:
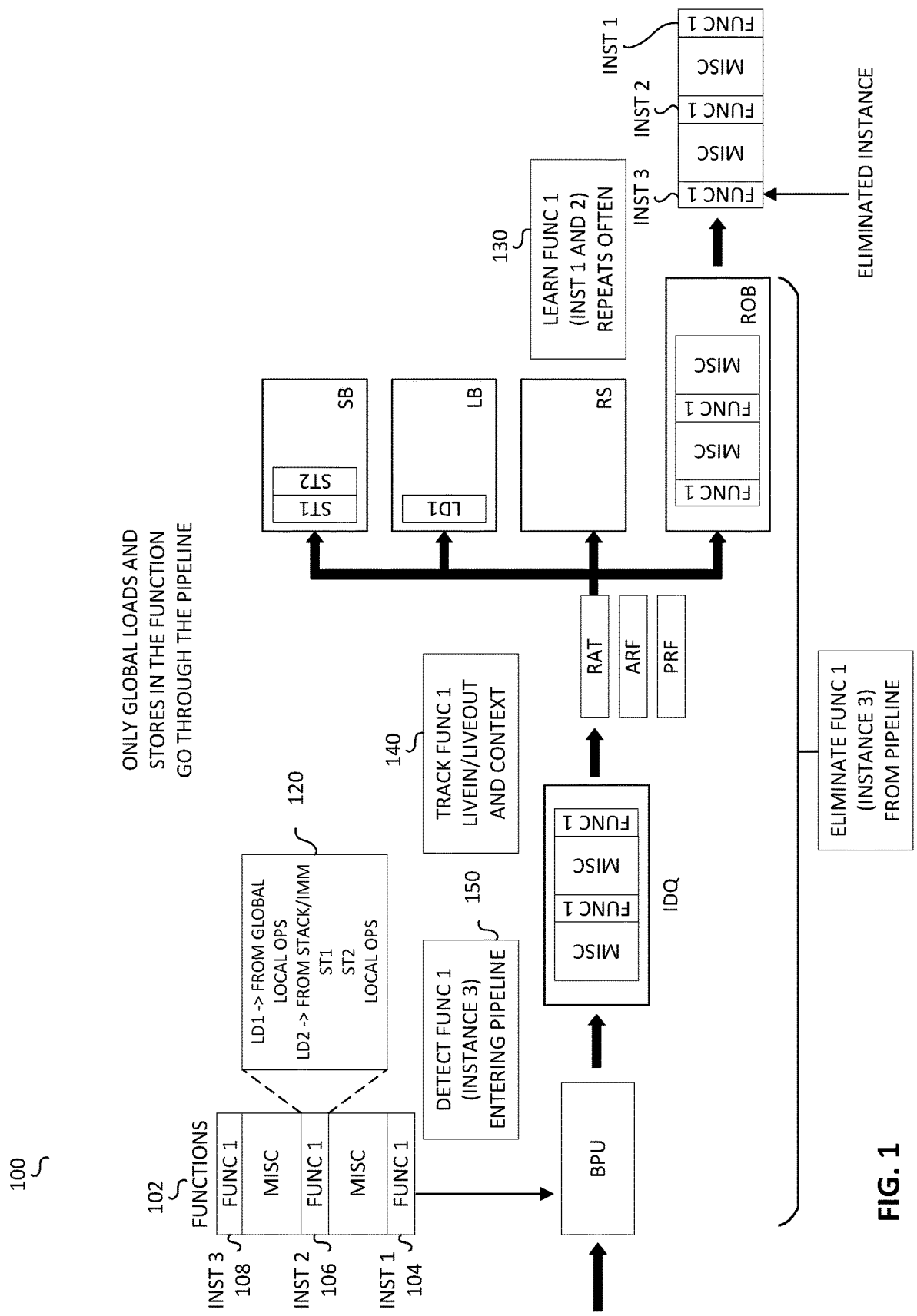
FIG. 1 is a block diagram illustrating an overview of hardware-based function memorization in a processing pipeline according to an embodiment.

Embodiments of apparatus and method for hardware-based memorization of function calls to improve processor performance are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. For clarity, individual components in the Figures herein may be referred to by their labels in the Figures, rather than by a particular reference number.

A function call is a programming construct used in applications to accomplish a specific functionality. If a functionality is commonly used, multiple instances of the same function call may be made from different locations within the same application or from different applications. Some function calls require input parameters, others do not. Different calls to the same function don't always produce the same results. Specifically, depending on the input parameters to the function, the outputs produced by the function may vary. However, when the same input parameters are used in different call to the same function (i.e. different instances of the same function call), the outputs produced across the different calls should be the same. Thus, if a function call's input parameters and output values are learned and captured in a table, future function calls with the same input parameters can be simulated simply by using the stored output values from the table, thereby avoiding redundant executions. Specifically, the output values can be quickly obtained from the table and provided to subsequent instructions that are data-dependent on the function call, without actually executing the function. The tracking of the execution blocks of function calls and the mimicking of their executions from tables is known as memorization. Current techniques to memorize application functions exist only in software and focus mostly on math functions. A more robust hardware-focused solution is thus needed.

Aspects of the present invention relate to hardware-based memorization of code within application functions to reduce redundant executions. Each function comprises a function block. The function block, according to an embodiment, is defined by a "call . . . return" sequence. For example, in an instruction stream, a function begins with a call instruction and ends with a return instruction. Together, the call instruction and the return instruction, and any instructions that span between them, form the function block.

Identifying often-repeating functions with same input signatures and eliminating them from the CPU pipeline (spanning fetch . . . execute . . . retire stages) greatly enhances the performance and energy efficiency of processor cores. Embodiments of the present invention address several considerations associated with hardware memorization. These considerations include:

- How to quickly learn about functions that repeat often enough with the same input/output values so that these functions can be eliminated as early and as often as possible for maximum return on investment (ROI). This also includes how to learn new opportunities (i.e. new functions) when the application phase changes.
- How to concisely and effectively capture the input arguments and output results of a function in a storage-efficient manner.
- Once predicted, how to correctly eliminate opportune dynamic invocations of the application function block from the CPU pipeline while allowing dependent instructions following the function call to proceed with their dependent data values as early as possible.
- How to define the necessary microarchitecture for efficient speculation and handling of incorrectly speculated events across processor core clusters Described herein are hardware-based function memorization techniques to efficiently identify functions that are called repeatedly to perform the same work and to eliminate their execution from the processing pipeline. The described embodiments not only identify targets with high return on investment (ROI) for memorization, but also capture the function states efficiently. In one embodiment, a predictor is incorporated in the front-end of a processor pipeline to detect potential function call instances to be memorized. When an incorrect prediction is made, the incorrectly memorized function call instance is re-executed. By providing the output values of the memorized functions from a table and performing output register writes and necessary "live-out" stores to memory, embodiments described herein enable early execution of younger instructions that depend on data from the memorized functions to achieve significant performance gains. According to an embodiment, the proposed memorization technique captures and learns the live-ins of a function, including explicit register-based live-ins that are input arguments into a function, as well as global loads to memory in the function body that determine code path and function outputs. In some embodiments, loads and stores to the stack frame of the function call instance are not tracked because these are intermediates are invisible after a function call returns, when the stack frame is reclaimed.

High Level Overview of Hardware-Based Function Memoization

FIG. 1 illustrates an overview of hardware-based function memorization in a processing pipeline according to an embodiment. The processing pipeline 100 includes several processing stages handled by corresponding hardware components such as branch prediction unit (BPU), instruction decode queue (IDQ), register alias table (RAT), architecture register file (ARF), physical register file (PRF), store buffer (SB), load buffer (LB), reservation station (RS), re-order buffer (ROB), etc. The respective functions of these stages and/or components are well-known in the art and are omitted here for brevity unless otherwise noted.

As illustrated, a stream of instructions 120 is to be processed by the pipeline 100. The instruction stream may include several instances of the same function (e.g., Function 1) called from various locations within an application or from different applications. As illustrated, 3 instances of Function 1 are present in the instruction stream 102. The first to be processed is instance 1 104, followed by instance 2 106 and then instance 3 108. According to an embodiment, the instances are retired or outputted from the pipeline in the same order they entered. The instances need not be processed consecutively. In other words, the pipeline may process other miscellaneous instructions in between the instances. Each instance of the function is associated the same function block/body 120 which may include one or more instructions that are to be decoded into micro-operations (uops) and processed by the pipeline to perform load, store, and computational (add, subtract, compare etc.) operations. The load instructions may include global loads (values visible from outside the function) and local loads (values visible only from inside the function), as well as store operations. Each instance of the function may be associated with a process counter and/or a program context.

As instruction from the instruction stream 102 exits or retires from pipeline 100, frequently-called functions that repeat with the same input operand(s) and output value(s) are identified and tracked at 130. For example, as instance 1 104 and instance 2 106 of Function 1 exits or retires from pipeline 100, Function 1 is identified as a candidate for memorization. Responsively, its live-in values, live-out values, and/or context values are determined and stored at 140. Live-in and live-out values used herein refer to the input and output registers or memory locations accessed by the function or by the instructions in or preceding the function block. In some embodiments, the live-in values are determined based on load instructions and the live-out values are determined based on the store instructions.

When a sufficient confidence level associated with a function is reached, such as based on the number of occurrences, the entire body of the function, minus a few exceptions, are skipped by the pipeline. For example, when instance 3 108 of Function 1 entering the pipeline 100 is detected at 150, its function block is removed from the pipeline at 160. Instructions that depend on the data produced from the execution of Function 1 are provided with data from the stored live-outs obtained from instance 1 and/or instance 2's execution. Eliminating repeated instructions from the processing pipeline brings performance and power gains by saving time and resources that otherwise would have to be spent for their execution. Moreover, the execution of subsequent instructions that are data-dependent on the eliminated instructions can be accelerated because they can now get the required data much earlier.

Microarchitectural Changes to Enable Hardware Function Memoization

According to an embodiment, enablement of function memorization in hardware involves:
1. Identify specific functions with a high ROI for memorization.
2. Capture memorizable functions and their input/output signatures.
3. Detect memorizable functions early in the processing pipeline and skip the fetch of the function body.

Figure 2:
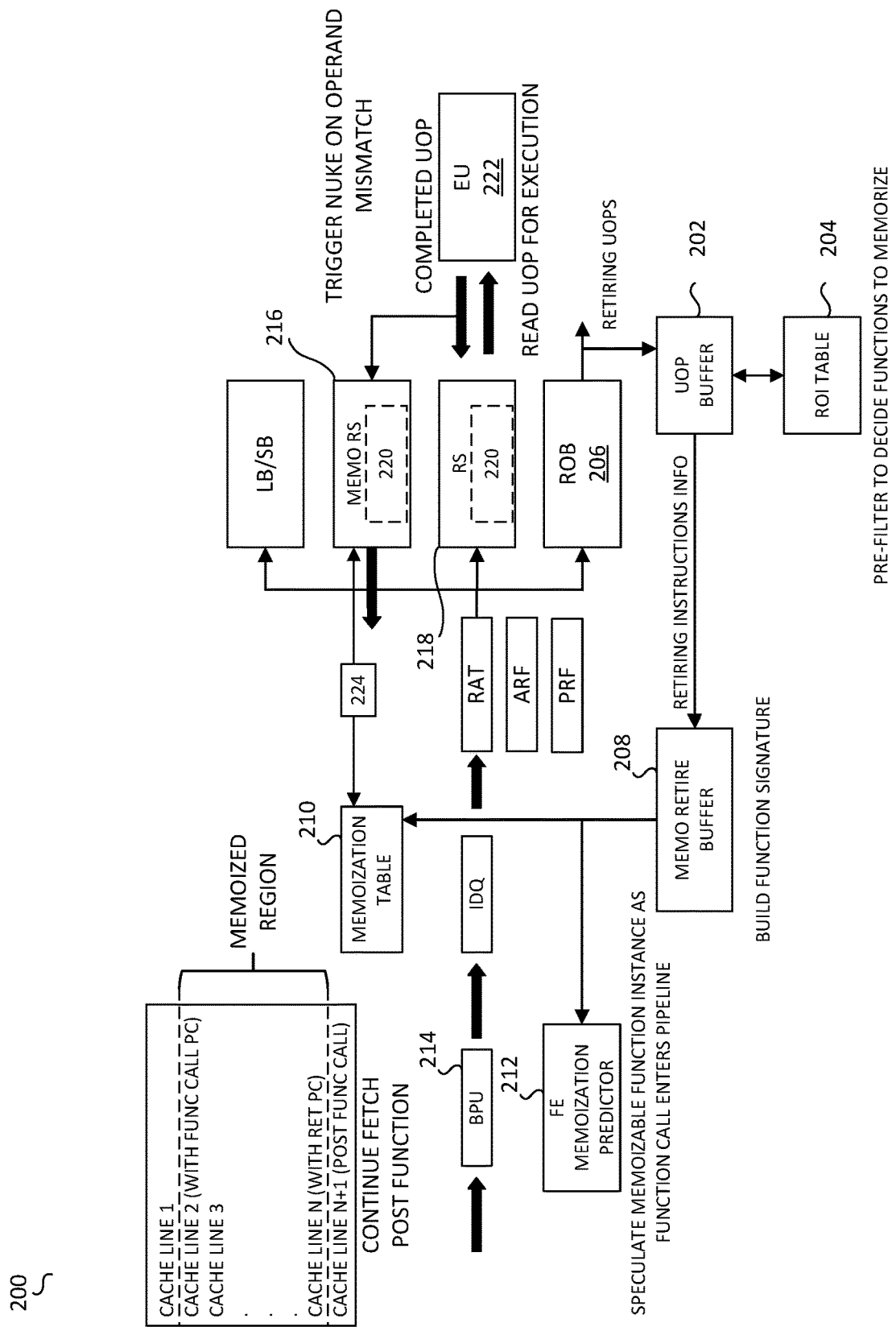
FIG. 2 is a block diagram illustrating a hardware platform for function memorization on which embodiments of the present disclosure may be implemented.

4. Track the speculatively memorized region in pipeline to detect mis-prediction.
5. Continuing fetch post the memorization region FIG. 2 illustrates a hardware platform for function memorization on which embodiments of the present invention may be implemented. Hardware platform 200 includes a processing pipeline for processing instructions. The processing pipeline in hardware platform 200 may include some of the same pipeline stages and/or hardware components as processing pipeline 100 of FIG. 1. As illustrated, the hardware platform 200 may additionally include a uop buffer 202, an ROI table 204, a memorization retirement buffer 208, a memorization table 210, a front-end memorization predictor (FE predictor) 212, and a memorization reservation station 216.

According to an embodiment, memorizable functions are identified based on uops retiring from the processing pipeline. An uop buffer 202 may be implemented to capture the uops retiring in each pipeline cycle. In one embodiment, the uop buffer 202 is communicatively coupled to the ROB and is configured to monitor and/or store the uops retiring from the ROB 206. In some embodiments, the uop buffer 202 is included in, or implemented as part of, the ROB. The size of the uop buffer may be larger than the retirement width of the ROB to avoid stalling the retirement stage and/or dropping uops. In an embodiment, the UOP buffer is twice the size of the retirement width of the ROB.

From the uop buffer 202, the retired uops stored therein are checked for function calls. When a function call (e.g., a call uop) is detected in the uop buffer 202, an ROI table 204 is accessed to see if the associated function is blacklisted or if it should be tracked to see if it is sufficiently recurring. The information stored in the ROI table 204 thus provides a first level filter to rule out functions that should not be memorized. For example, in some embodiments, functions that contain system calls or floating-point calculations are excluded from memorization because their potential performance gains are minimal when taking into account the costs (e.g., storage and processing costs). These excluded functions may be marked accordingly in the ROI table to prevent them from being memorized.

Each time a function (e.g., a call uop) is detected in the uop buffer 202, a corresponding entry in the ROI Table 204 is updated. If no such entry exists in the ROI Table 204, a new entry is created to track the occurrence of the detected function call. According to an embodiment, each entry in the ROI table 204 corresponds to a function. Each entry may include an identifier or tag for identifying the corresponding function (e.g., a program counter (PC)), an occurrence counter for determining whether the corresponding function call is occurring with sufficient repetition, and a memorizable field to indicate whether the function is memorizable or should be avoided (i.e. blacklisted). The occurrence count of an entry is incremented each time the corresponding function is detected in the uop buffer 202. When the occurrence count of an entry is over a threshold, the memorizable field may be set to a value to indicate that the corresponding function has a high enough ROI and thus should be memorized. For function calls that should be avoided, the memorizable field may be set to a value to indicate the corresponding function is not to be memorized. A function may be blacklisted if it is associated with a system call or floating point instruction.

Based on the information in the ROI table 204, when a function is deemed sufficiently reoccurring and ready for memorization, a memorization retirement buffer 208 builds and stores a signature of the function. The signature may include the live-in and live-out values (i.e. inputs and outputs) along with other context information associated with the function call. The live-in values may include registers and memory locations accessed by the function. They may also include the actual load values stored in these locations. The live-out values may include output registers and memory locations accessed by the function, as well as the values to be stored in those locations. In one embodiment, the memorization retirement buffer 208 may build the signature based on an application binary interface (ABI). In some embodiments, the load and store operations within the function body and the ordered sequence in which they occur are also tracked by the memorization retirement buffer 208 and included as part of the signature. The ordering of these operations is important to preserve correctness. According to an embodiment, some load operations do not matter and thus can be ignored. For example, loads for loading local values from the stack need not be tracked and can be ignored. Other load uops, such as those that tracking global variables are already captured as part of the function's input signature and thus also need not be tracked. The output signature may include the writes to registers, as determined by the ABI.

Figure 3:
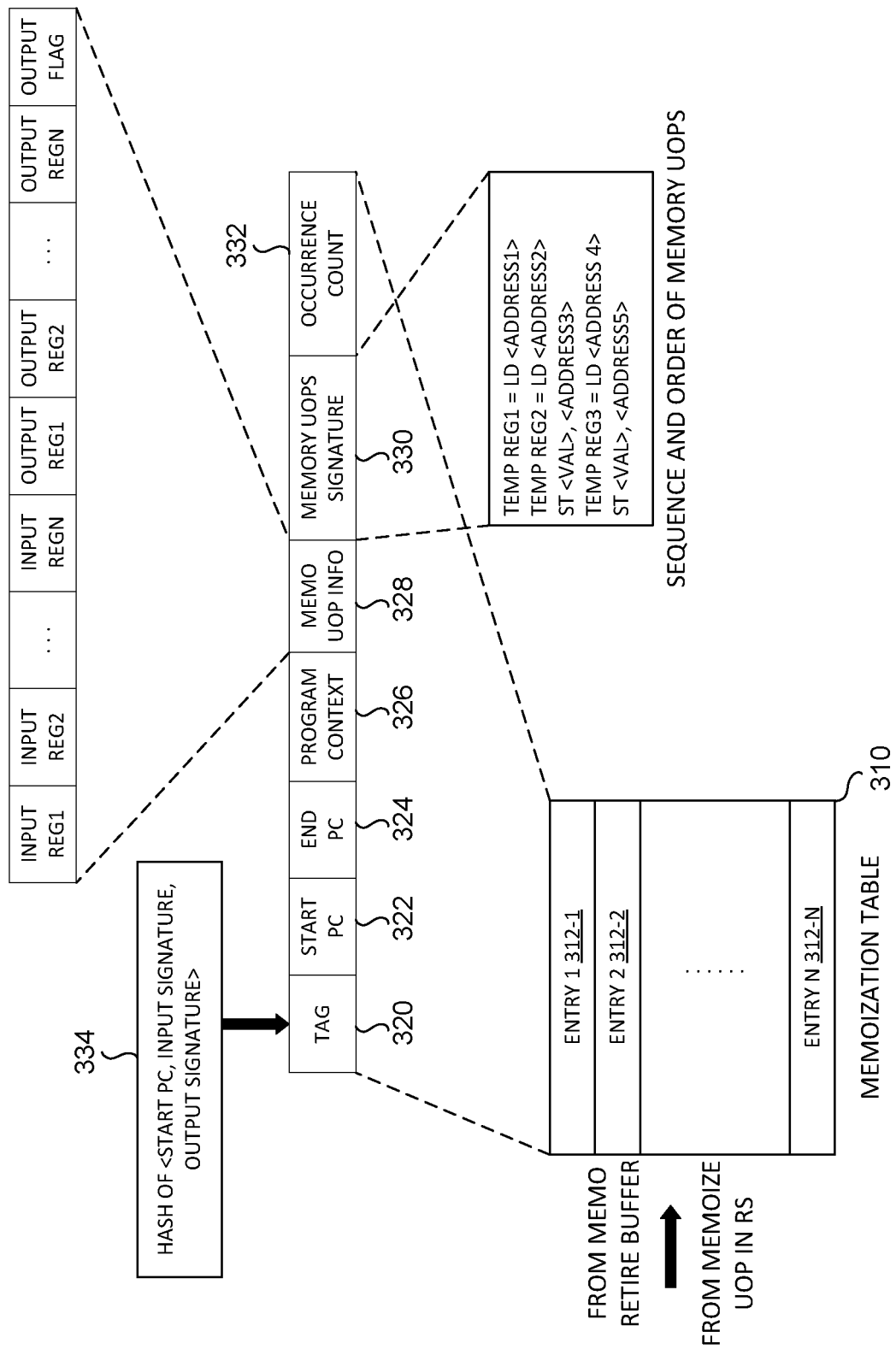
FIG. 3 illustrates a logical view of an embodiment of a memorization table.

Once the memorizable function signature is built, it is pushed to a Memoization Table 210 for storage. If the signature is already captured by an existing table entry, an occurrence counter in the entry may be incremented. If the signature is not captured by an existing table entry, a new table entry is allocated for the incoming function signature. FIG. 3 illustrates a logical view of a Memoization Table according to an embodiment. Memoization table 310 includes one or more entries 312 for storing memorized function signatures. Each memorized function signature is associated with a function of a particular set of inputs, outputs, and context information. Each table entry 312 includes a plurality of fields to store information about the memorized function. According to an embodiment, the fields store information such as the tag 320, start program counter 322, end program counter 324, program context 326, memorized uop information 328, memory uops signature 330, and occurrence count 332. The tag 320 is used to identify the memorized function. In one embodiment, the tag is a hash 334 of the function's starting program counter, input signature, and output signature. The input signature may be a list of the registers and memory locations, or their stored values, accessed by the function. Similarly, the output signature may be a list of registers or memory locations to which results produced by the function are stored. The starting program counter 322 and the output program counter 324 may be the memory address of the respective call and return uops that define the function block. The program context 326 is the branch information received from the branch prediction unit for identifying the application program that made the function call. The memorized uop information 328 stores in the input and output signatures of the function. The memory uops signature 330 stores an ordered sequence of the instructions or uops in the function block. The occurrence count 332 tracks the number of times the memorized function signature has been generated and provided by the memorization retirement buffer 208. Thus, the higher the occurrence count, the more times the corresponding function was called.

Returning to FIG. 2, to eliminate redundant executions of function blocks utilizing the memorized function signatures, a Front-End Memoization Predictor (FE predictor) 212 is implemented to detect memorizable functions. To maximize the reduction in pipeline resource usage, according to some embodiments, the FE predictor 212 is implemented early in the processing pipeline so it can detect function calls as soon as they enter the processing pipeline. When a function call (i.e. call instruction) is detected, the FE predictor 212 determines whether the particular instance of the call instruction is memorizable. Given that a function can be called from different places in an application and in different program contexts, the FE predictor 212 distinguishes between different instances of the same call instruction by keeping track of the program counter of each call instruction along with the specific program context from which the call instruction was made. For instance, two call instructions calling the same function may have the same program counter value but different program context values if they were called by different applications (i.e. different program context). In such case, they would be considered two different call instruction instances. In some embodiments, each call instruction instance is associated with a confidence level to indicate whether the particular instance is safe for memorization. For example, if the confidence level is higher than a minimum confidence threshold, then the call instruction with the specific program counter and program context values is deemed a candidate for memorization.

Figure 4:
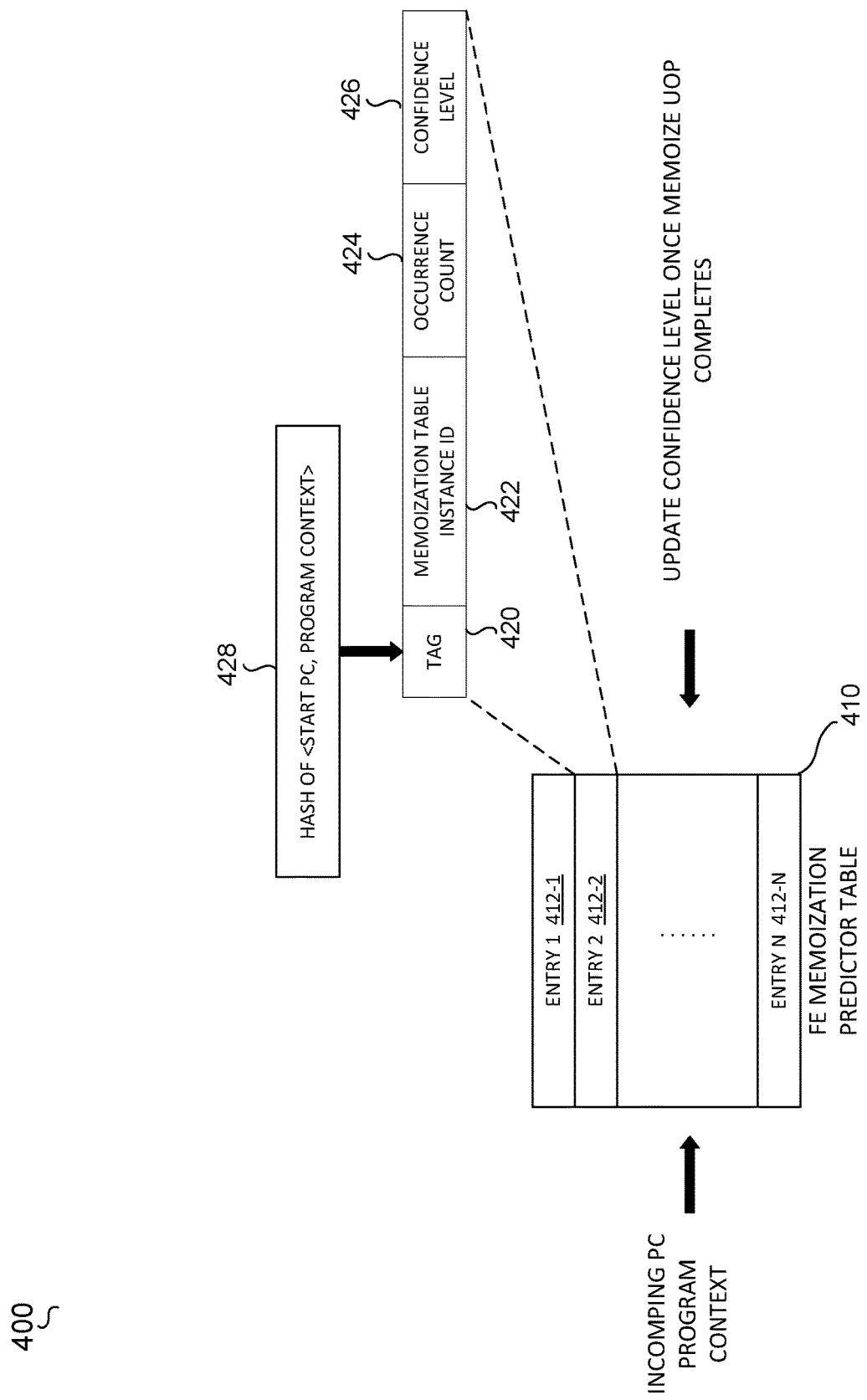
FIG. 4 illustrates a logical view of an embodiment of a front-end memorization predictor table.

FIG. 4 illustrates a front-end memorization predictor table according to an embodiment. Each entry 412 of the table 410 stores the information corresponding to a call instruction of particular program counter and program context. The entry 412 contain fields to store information associated with a call instruction including the tag 420, memorization table instance identifier 422, occurrence count 424, and confidence level 426. In some embodiments, the tag is a hash of the starting program counter and the program context values of a call instruction. These values may be provided by the memorization retirement buffer 208. For example, when a function signature is built and provided to the memorization table 210 for storage, the memorization retirement buffer 208 may provide information about the starting program counter, program context, and memorization table instance identifier to the FE predictor 210 which is stored in an entry of the FE predictor table 410. Then, when an incoming call instruction enters the processing pipeline, the FE predictor 212 compares a hash of the incoming call instruction's program counter and program context against tags 420 in the table 410 to obtain a match. The program context information of the incoming call instruction may be obtained from the branch path information used by the BPU 214. If a matching entry is found, the occurrence count 424 of the entry is incremented. If the confidence level 426 in the entry is above a minimum confidence threshold, then the incoming call instruction is memorized. This means the function block called by the call instruction is removed from the processing pipeline. According to an embodiment, not all instructions in the function block are removed. As noted above, global loads, which may obtain data from outside the function block, help identify changes in memory values between different instances of the function and are therefore left in place in the pipeline. The same goes for store instructions which are left as is in the pipeline to ensure correctness.

Returning to FIG. 2. Given that the FE predictor 212 speculates on the incoming function call being memorizable, a validation mechanism is implemented to minimize the effects of a misprediction by ensuring that the input signature of the function instance selected by the FE predictor matches that of the memorized function stored in the memorization table. To accomplish this, an artificial memorize uop 220 is inserted in place of the memorized function block. For instance, the call instruction is replaced by the memorize uop in the processing pipeline to track the input signature of the function instance. The memorize uop goes through the processing pipeline as usual and arrive at the reservation station 218 to collect input values of the call instruction. Typically, the input values to the call instruction are provided by the instructions preceding the call instruction in the instruction stream. These instructions are executed by the execution unit 222 and their results provided to memorize uop in the reservation station. Once all the input values are collected by the memorized uop, they are compared against the input values of the corresponding entry in the memorization table 210 by validation circuitry 224. If the input values match, the memorize uop is removed from the pipeline and the confidence level of the corresponding entry in the FE predictor 212 is incremented. If the input values don't match, then the Memorize uop triggers a nuke in the processing pipeline to restart execution of the function using the call instruction program counter. In some cases, the reservation station 220 may have constraints on the number of input and output values that can be stored. Thus, in some embodiments, a special memorization reservation station 216 is used for handling memorize uops. In other embodiments, existing reservation station 218 is modified to accommodate memorized uops.

Figure 5:
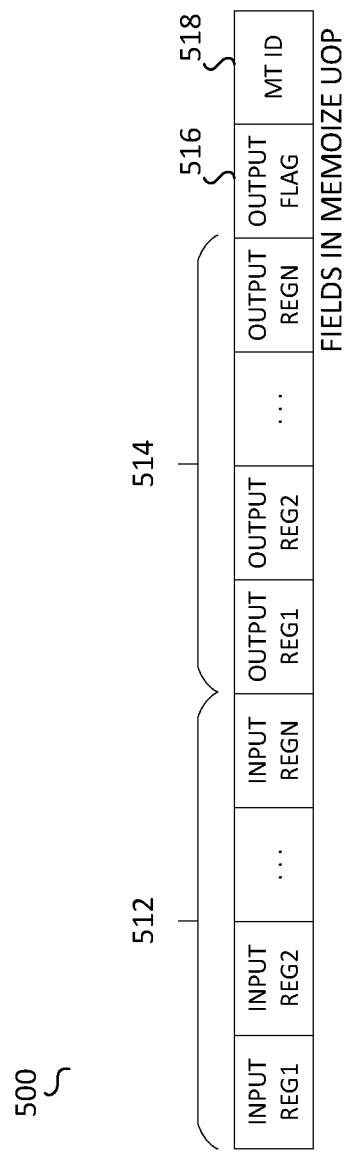
FIG. 5 illustrates an embodiment of a memorized uop.

FIG. 5 is a block diagram illustrating the memorize uop according to an embodiment. The memorize uop includes a plurality of fields for collecting and storing information such as input registers or values 512, output registers or values 514, output flag 516, and memorization table instance identifier 218. The memorization table instance identifier 518 is used to identify the entry in the memorization table 210 with which the input/output values of the memorize uop are compared. The memorization table identifier 510 may be obtained from the FE memorization predictor table 410 or from them memorization table 210 when generating the memorize uop.

Besides eliminating the function body, another reason for the performance gain comes from enabling all the instructions that are dependent on the function body to start their execution earlier than otherwise. To enable this, a temporary move uops may be inserted into the processing pipeline to dynamically to allow the RAT to rename the output registers in the memorized region for the later instructions to allow them to begin execution.

Figure 6:
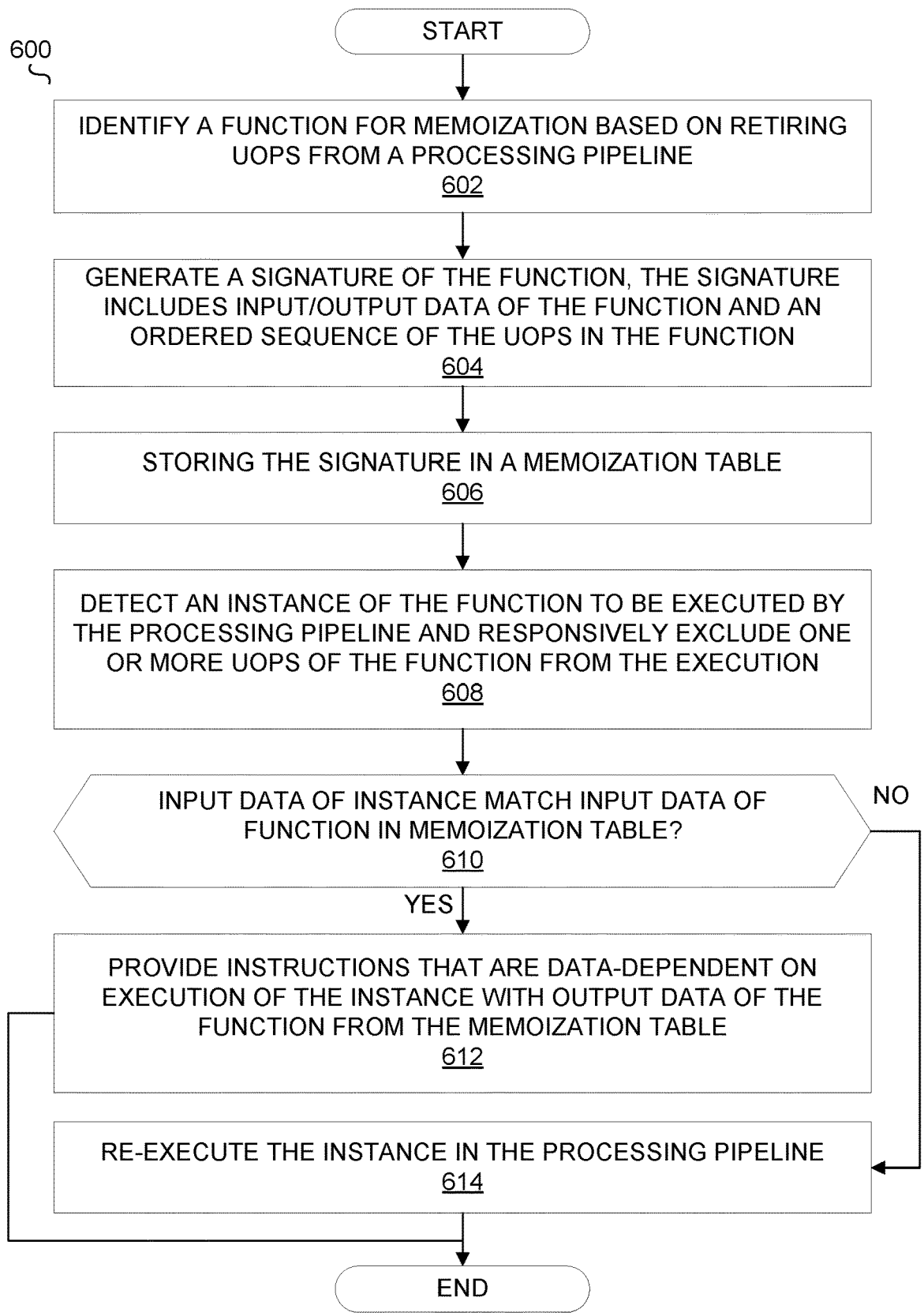
FIG. 6 is a flow diagram illustrating a method for memorizing a function according to an embodiment.

FIG. 6 is a flow diagram illustrating a method for memorizing a function according to an embodiment. Method 600 may be implemented in any hardware platform described herein. In one embodiment, method 600 is implemented by hardware platform 200. At 602 a function for memorization is identified based on retiring uops from a processing pipeline. The function may be selected for memorization based on the number of occurrences of a call uop in the retiring uops. Some functions, such as those involving system calls and floating-point operations are excluded from memorization. At 604, a signature of the function for memorization is generated. The signature may include input and output registers/memory locations accessed by the function and/or their stored values. The signature may also include an ordered sequence of uops in the function block of the function. At 606, the signature is stored in a memorization table. At 608, a request to execute an instance of the function in the processing pipeline is detected. The detection may be made by a predictor coupled to an early stage of the processing pipeline (e.g., the BPU). Responsive to the detection, one or more uops associated with the instance is excluded from execution in the pipeline. Some instructions, such as stores and global loads, may remain in the pipeline to be execution. At 610, the input data of the instance is compared against the input data of the function's signature stored in memorization table. If the data match, at 612, instructions that are dependent on the execution of the instance is provided with the output data from the memorization table. In case of a data mismatch, the instance of the function is re-inserted into the processing pipeline to be executed at 614. This may involve nuking the pipeline to abort any execution of the instruction from the prior instance of the function that were allowed to execute.

While buffers (e.g., uop buffer, memorization retirement buffer) and tables (e.g., ROI table, memorization table, FE memorization predictor table) are described herein, it will be apparent to one of ordinary skill in the art that any suitable type of data storage structure may be used instead. Each of the data storage structures described herein may also include hardware logic or circuitry to carry out various functions relating to its operation.

EXAMPLES

The following are example implementations of different embodiments of the invention.

Example 1. An apparatus that includes uop buffer circuitry to identify a function for memorization based on retiring uops from a processing pipeline, the function associated with a function block of a plurality of uops; memorization retirement buffer circuitry to generate a signature of the function, the signature comprising input and output data of the function and an ordered sequence of the plurality of uops in the function block; a memorization data structure store in an entry the signature associated with the function; and predictor circuitry to detect an instance of the function to be executed by the processing pipeline and responsively exclude a first subset of uops associated with the instance from execution when a confidence level associated with the function is above a threshold. One or more instructions that are data-dependent on execution of the instance is then provided with the output data of the function from the memorization data structure.

Example 2. The apparatus of Example 1, wherein the uop buffer circuitry is coupled to a re-order buffer (ROB) of the processing pipeline to store the retiring uops.

Example 3. The apparatus of Example 2, wherein the ROB is associated with a retirement width and the uop buffer circuitry comprises a storage structure that is sized at twice the retirement width of the ROB.

Example 4. The apparatus of Example 3, wherein the uop buffer circuitry is to track occurrences of a call uop in the storage structure to identify the function for memorization.

Example 5. The apparatus of Example 1, wherein the function is excluded from memorization when the function contains a system call or a floating-point calculation.

Example 6. The apparatus of Example 1, wherein a second subset of the uops of the instance remains in the processing pipeline for execution.

Example 7. The apparatus of Example 6, wherein the second subset comprises store uops and/or global load uops.

Example 8. The apparatus of Example 1, wherein the predictor circuitry is further to insert a dummy uop in the processing pipeline in place of the first subset of the plurality of uops excluded from the processing pipeline, the dummy uop usable to collect input and output values associated with the instance, the input and output values usable for validating memorization of the instance.

Example 9. The apparatus of Example 8, further includes a validation circuitry to validate the input and output values collected by the dummy uop against the input and output data of the function stored in the memorization data structure.

Example 10. The apparatus of Example 9, wherein the dummy uop comprises a memorization data structure identifier for locating the entry in the memorization data structure.

Example 11. The apparatus of Example 9, wherein responsive to a positive validation by the validation circuitry, the dummy uop is removed from the processing pipeline and a confidence level of the instance tracked by the predictor circuitry is incremented.

Example 12. The apparatus of Example 9, wherein responsive to a negative validation by the validation circuitry, the instance of the function is re-inserted into the processing pipeline for execution.

Example 13. The apparatus of Example 1, wherein the input and output data of the function comprise registers and/or memory locations accessed by uops in the function block associated with the function.

Example 14. A method that includes: identifying a function for memorization based on retiring micro-operations (uops) from a processing pipeline, the function associated with a function block of a plurality of uops; generating a signature of the function, the signature comprising input and output data of the function and an ordered sequence of the plurality of uops in the function block; storing in an entry the signature associated with the function in a memorization data structure; detecting an instance of the function to be executed by the processing pipeline and responsively excluding a first subset of uops associated with the instance from execution when a confidence level associated with the function is above a threshold; and providing one or more instructions that are data-dependent on execution of the instance with the output data of the function from the memorization data structure.

Example 15. The method of Example 14, further includes storing the retiring uops in a uop buffer which is coupled to a re-order buffer (ROB) of the processing pipeline.

Example 16. The method of Example 15, wherein the ROB is associated with a retirement width and the method further comprises sizing the uop buffer at twice the retirement width of the ROB.

Example 17. The method of Example 15, further includes tracking occurrences of a call uop in the uop buffer to identify the function for memorization.

Example 18. The method of Example 14, further comprises excluding the function from memorization when the function contains a system call or a floating-point calculation.

Example 19. The method of Example 14, further comprises leaving a second subset of the uops of the instance in the processing pipeline for execution.

Example 20. The method of Example 19, wherein the second subset comprises store uops and/or global load uops.

Example 21. The method of Example 14, further comprises inserting a dummy uop in the processing pipeline in place of the first subset of the plurality of uops excluded from the processing pipeline, the dummy uop usable to collect input and output values associated with the instance, the input and output values usable for validating memorization of the instance.

Example 22. The method of Example 21, further comprises validating the input and output values collected by the dummy uop against the input and output data of the function stored in the memorization data structure.

Example 23. The method of Example 22, further comprises using a memorization data structure identifier in the dummy uop to locate the entry in the memorization data structure.

Example 24. The method of Example 22, further comprises removing the dummy uop from the processing pipeline and incrementing a confidence level of the instance responsive to a positive validation.

Example 25. The method of Example 22, further comprises re-inserting the instance of the function into the processing pipeline for execution responsive to a negative validation.

Example 26. The method of Example 14, wherein the input and output data of the function comprise registers and/or memory locations accessed by uops in the function block associated with the function.

Exemplary Processor Architectures and Data Types

Figure 7:
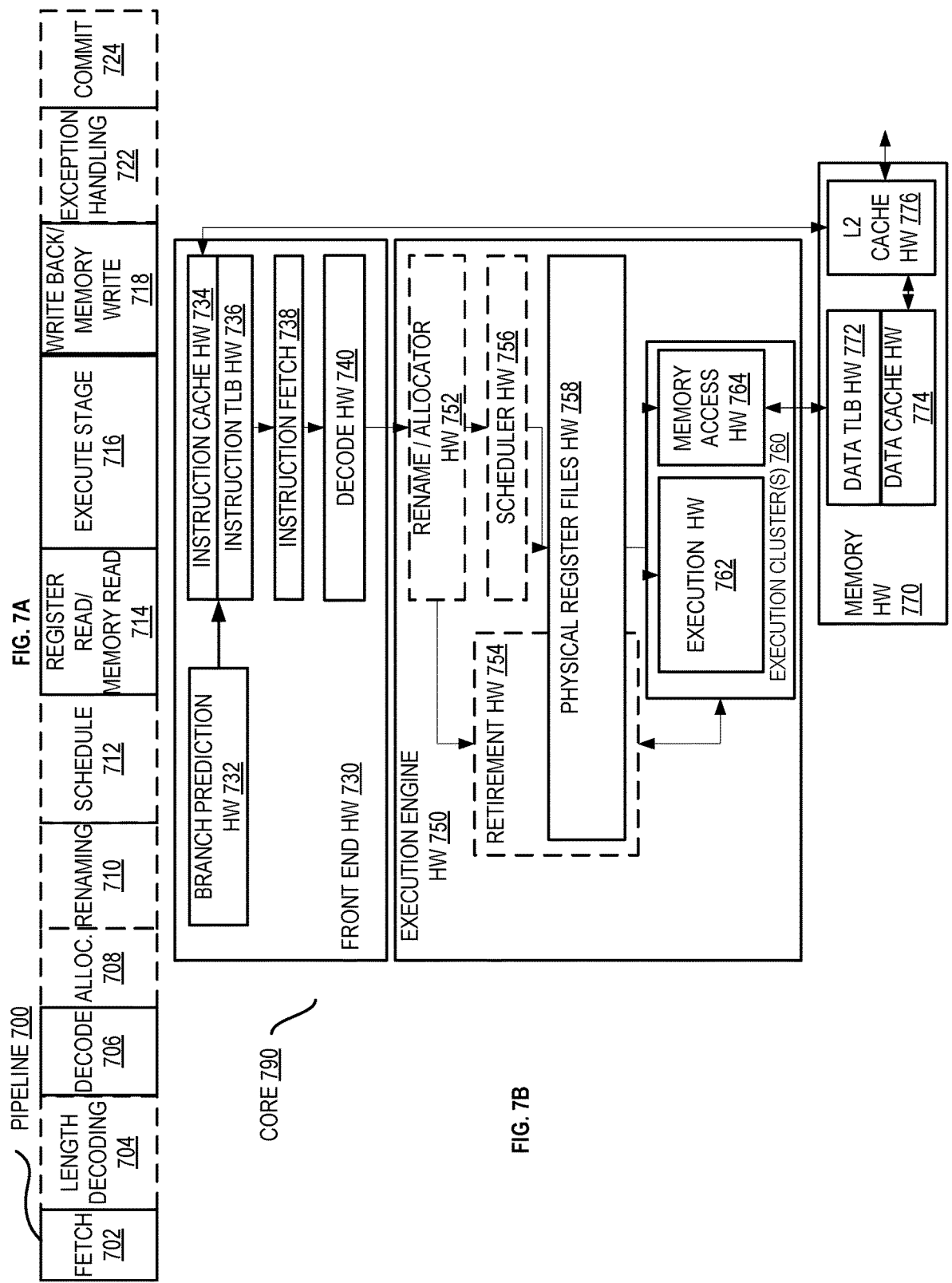
FIG. 7A is a block diagram illustrating both an exemplary in-order pipeline and an exemplary register renaming, out-of-order issue/execution pipeline according to embodiments of the invention.
FIG. 7B is a block diagram illustrating both an exemplary embodiment of an in-order architecture core and an exemplary register renaming, out-of-order issue/execution architecture core to be included in a processor according to embodiments of the invention.

FIG. 7A is a block diagram illustrating both an exemplary in-order pipeline and an exemplary register renaming, out-of-order issue/execution pipeline according to embodiments of the invention. FIG. 7B is a block diagram illustrating both an exemplary embodiment of an in-order architecture core and an exemplary register renaming, out-of-order issue/execution architecture core to be included in a processor according to embodiments of the invention. The solid lined boxes in FIGS. 7A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 790 including a front end hardware 730 coupled to an execution engine hardware 750, and both are coupled to a memory hardware 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front end hardware 730 includes a branch prediction hardware 732 coupled to an instruction cache hardware 734, which is coupled to an instruction translation lookaside buffer (TLB) 736, which is coupled to an instruction fetch hardware 738, which is coupled to a decode hardware 740. The decode hardware 740 (or decoder) may decode instructions, and generate as an output one or more micro-operations, micro-code entry points, microinstructions, other instructions, or other control signals, which are decoded from, or which otherwise reflect, or are derived from, the original instructions. The decode hardware 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode hardware 740 or otherwise within the front end hardware 730). The decode hardware 740 is coupled to a rename/allocator hardware 752 in the execution engine hardware 750.

The execution engine hardware 750 includes the rename/allocator hardware 752 coupled to a retirement hardware 754 and a set of one or more scheduler hardware 756. The scheduler hardware 756 represents any number of different schedulers, including reservations stations, central instruction window, etc. The scheduler hardware 756 is coupled to the physical register file(s) hardware 758. Each of the physical register file(s) hardware 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) hardware 758 comprises a vector registers hardware, a write mask registers hardware, and a scalar registers hardware. This register hardware may provide architectural vector registers, vector mask registers, and general purpose registers. The physical register file(s) hardware 758 is overlapped by the retirement hardware 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement hardware 754 and the physical register file(s) hardware 758 are coupled to the execution cluster(s) 760. The execution cluster(s) 760 includes a set of one or more execution hardware 762 and a set of one or more memory access hardware 764. The execution hardware 762 may perform various operations (e.g., shifts, addition, subtraction, multiplication) and on various types of data (e.g., scalar floating point, packed integer, packed floating point, vector integer, vector floating point). While some embodiments may include a number of execution hardware dedicated to specific functions or sets of functions, other embodiments may include only one execution hardware or multiple execution hardware that all perform all functions. The scheduler hardware 756, physical register file(s) hardware 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler hardware, physical register file(s) hardware, and/or execution cluster—and in the case of a separate memory access pipeline, certain embodiments are implemented in which only the execution cluster of this pipeline has the memory access hardware 764). It should also be understood that where separate pipelines are used, one or more of these pipelines may be out-of-order issue/execution and the rest in-order.

The set of memory access hardware 764 is coupled to the memory hardware 770, which includes a data TLB hardware 772 coupled to a data cache hardware 774 coupled to a level 2 (L2) cache hardware 776. In one exemplary embodiment, the memory access hardware 764 may include a load hardware, a store address hardware, and a store data hardware, each of which is coupled to the data TLB hardware 772 in the memory hardware 770. The instruction cache hardware 734 is further coupled to a level 2 (L2) cache hardware 776 in the memory hardware 770. The L2 cache hardware 776 is coupled to one or more other levels of cache and eventually to a main memory.

By way of example, the exemplary register renaming, out-of-order issue/execution core architecture may implement the pipeline 700 as follows: 1) the instruction fetch 738 performs the fetch and length decoding stages 702 and 704; 2) the decode hardware 740 performs the decode stage 706; 3) the rename/allocator hardware 752 performs the allocation stage 708 and renaming stage 710; 4) the scheduler hardware 756 performs the schedule stage 712; 5) the physical register file(s) hardware 758 and the memory hardware 770 perform the register read/memory read stage 714; the execution cluster 760 perform the execute stage 716; 6) the memory hardware 770 and the physical register file(s) hardware 758 perform the write back/memory write stage 718; 7) various hardware may be involved in the exception handling stage 722; and 8) the retirement hardware 754 and the physical register file(s) hardware 758 perform the commit stage 724.

The core 790 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 790 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache hardware 734/774 and a shared L2 cache hardware 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 8:
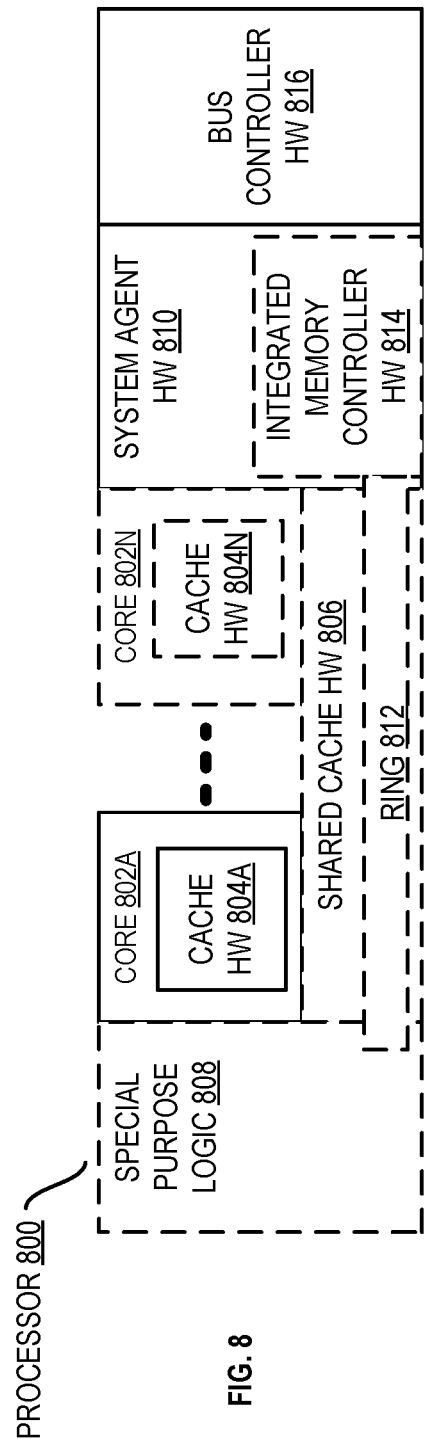
FIG. 8 is a block diagram of a single core processor and a multicore processor with integrated memory controller and graphics according to embodiments of the invention.

FIG. 8 is a block diagram of a processor 800 that may have more than one core, may have an integrated memory controller, and may have integrated graphics according to embodiments of the invention. The solid lined boxes in FIG. 8 illustrate a processor 800 with a single core 802A, a system agent 810, a set of one or more bus controller hardware 816, while the optional addition of the dashed lined boxes illustrates an alternative processor 800 with multiple cores 802A-N, a set of one or more integrated memory controller hardware 814 in the system agent hardware 810, and special purpose logic 808.

Thus, different implementations of the processor 800 may include: 1) a CPU with the special purpose logic 808 being integrated graphics and/or scientific (throughput) logic (which may include one or more cores), and the cores 802A-N being one or more general purpose cores (e.g., general purpose in-order cores, general purpose out-of-order cores, a combination of the two); 2) a coprocessor with the cores 802A-N being a large number of special purpose cores intended primarily for graphics and/or scientific (throughput); and 3) a coprocessor with the cores 802A-N being a large number of general purpose in-order cores. Thus, the processor 800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 800 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache hardware 806, and external memory (not shown) coupled to the set of integrated memory controller hardware 814. The set of shared cache hardware 806 may include one or more mid-level caches, such as level 2 (L2), level 3 (L3), level 4 (L4), or other levels of cache, a last level cache (LLC), and/or combinations thereof. While in one embodiment a ring based interconnect hardware 812 interconnects the integrated graphics logic 808, the set of shared cache hardware 806, and the system agent hardware 810/integrated memory controller hardware 814, alternative embodiments may use any number of well-known techniques for interconnecting such hardware. In one embodiment, coherency is maintained between one or more cache hardware 806 and cores 802-A-N.

In some embodiments, one or more of the cores 802A-N are capable of multi-threading. The system agent 810 includes those components coordinating and operating cores 802A-N. The system agent hardware 810 may include for example a power control unit (PCU) and a display hardware. The PCU may be or include logic and components needed for regulating the power state of the cores 802A-N and the integrated graphics logic 808. The display hardware is for driving one or more externally connected displays.

The cores 802A-N may be homogenous or heterogeneous in terms of architecture instruction set; that is, two or more of the cores 802A-N may be capable of execution the same instruction set, while others may be capable of executing only a subset of that instruction set or a different instruction set. In one embodiment, the cores 802A-N are heterogeneous and include both the "small" cores and "big" cores described below.

FIGS. 9-12 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 9:
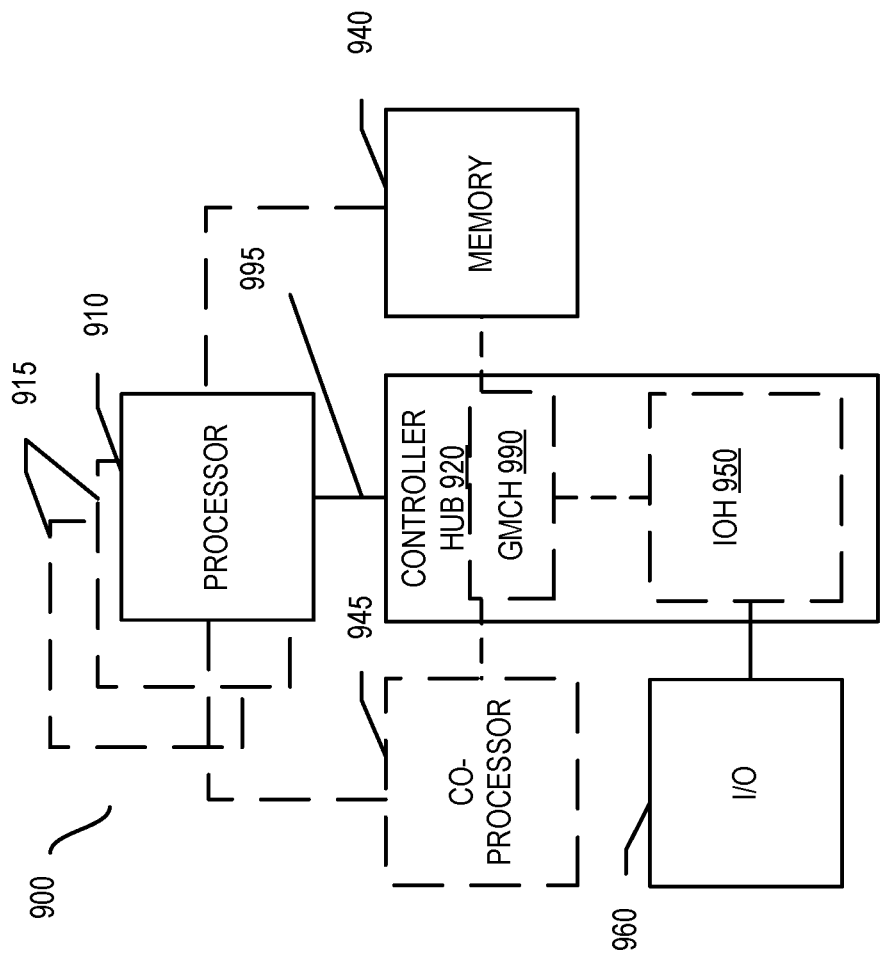
FIG. 9 illustrates a block diagram of a system in accordance with one embodiment of the present invention.

Referring now to FIG. 9, shown is a block diagram of a system 900 in accordance with one embodiment of the present invention. The system 900 may include one or more processors 910, 915, which are coupled to a controller hub 920. In one embodiment the controller hub 920 includes a graphics memory controller hub (GMCH) 990 and an Input/Output Hub (IOH) 950 (which may be on separate chips); the GMCH 990 includes memory and graphics controllers to which are coupled memory 940 and a coprocessor 945; the IOH 950 is couples input/output (I/O) devices 960 to the GMCH 990. Alternatively, one or both of the memory and graphics controllers are integrated within the processor (as described herein), the memory 940 and the coprocessor 945 are coupled directly to the processor 910, and the controller hub 920 in a single chip with the IOH 950.

The optional nature of additional processors 915 is denoted in FIG. 9 with broken lines. Each processor 910, 915 may include one or more of the processing cores described herein and may be some version of the processor 800.

The memory 940 may be, for example, dynamic random access memory (DRAM), phase change memory (PCM), or a combination of the two. For at least one embodiment, the controller hub 920 communicates with the processor(s) 910, 915 via a multi-drop bus, such as a frontside bus (FSB), point-to-point interface, or similar connection 995.

In one embodiment, the coprocessor 945 is a special-purpose processor, such as, for example, a high-throughput MIC processor, a network or communication processor, compression engine, graphics processor, GPGPU, embedded processor, or the like. In one embodiment, controller hub 920 may include an integrated graphics accelerator.

There can be a variety of differences between the physical resources 910, 915 in terms of a spectrum of metrics of merit including architectural, microarchitectural, thermal, power consumption characteristics, and the like.

In one embodiment, the processor 910 executes instructions that control data processing operations of a general type. Embedded within the instructions may be coprocessor instructions. The processor 910 recognizes these coprocessor instructions as being of a type that should be executed by the attached coprocessor 945. Accordingly, the processor 910 issues these coprocessor instructions (or control signals representing coprocessor instructions) on a coprocessor bus or other interconnect, to coprocessor 945. Coprocessor(s) 945 accept and execute the received coprocessor instructions.

Figure 10:
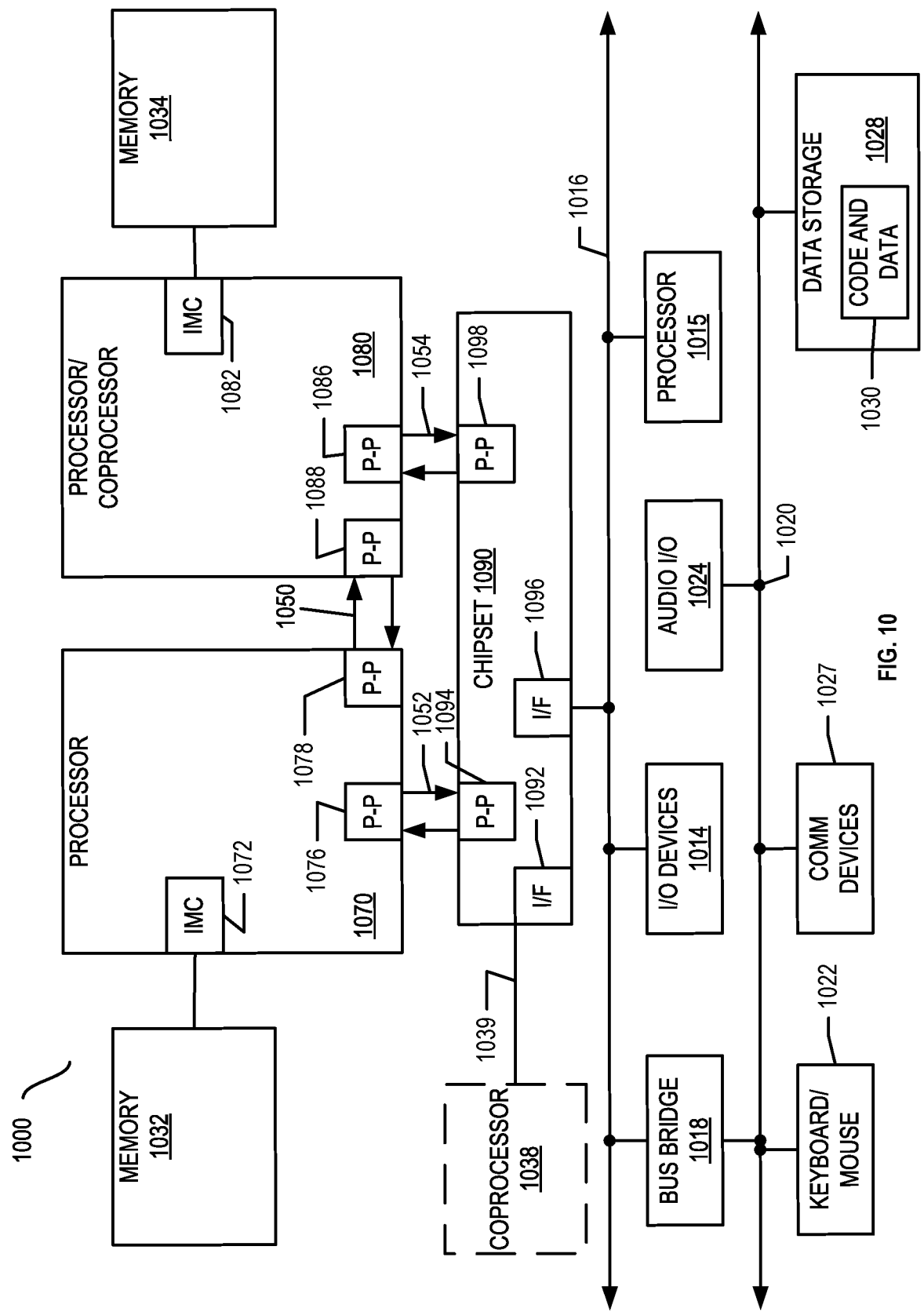
FIG. 10 illustrates a block diagram of a second system in accordance with an embodiment of the present invention.

Referring now to FIG. 10, shown is a block diagram of a first more specific exemplary system 1000 in accordance with an embodiment of the present invention. As shown in FIG. 10, multiprocessor system 1000 is a point-to-point interconnect system, and includes a first processor 1070 and a second processor 1080 coupled via a point-to-point interconnect 1050. Each of processors 1070 and 1080 may be some version of the processor 800. In one embodiment of the invention, processors 1070 and 1080 are respectively processors 910 and 915, while coprocessor 1038 is coprocessor 945. In another embodiment, processors 1070 and 1080 are respectively processor 910 coprocessor 945.

Processors 1070 and 1080 are shown including integrated memory controller (IMC) hardware 1072 and 1082, respectively. Processor 1070 also includes as part of its bus controller hardware point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 10, IMCs 1072 and 1082 couple the processors to respective memories, namely a memory 1032 and a memory 1034, which may be portions of main memory locally attached to the respective processors.

Processors 1070, 1080 may each exchange information with a chipset 1090 via individual P-P interfaces 1052, 1054 using point to point interface circuits 1076, 1094, 1086, 1098. Chipset 1090 may optionally exchange information with the coprocessor 1038 via a high-performance interface 1039. In one embodiment, the coprocessor 1038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of the present invention is not so limited.

As shown in FIG. 10, various I/O devices 1014 may be coupled to first bus 1016, along with a bus bridge 1018 which couples first bus 1016 to a second bus 1020. In one embodiment, one or more additional processor(s) 1015, such as coprocessors, high-throughput MIC processors, GPGPU's, accelerators (such as, e.g., graphics accelerators or digital signal processing (DSP) hardware), field programmable gate arrays, or any other processor, are coupled to first bus 1016. In one embodiment, second bus 1020 may be a low pin count (LPC) bus. Various devices may be coupled to a second bus 1020 including, for example, a keyboard and/or mouse 1022, communication devices 1027 and a storage hardware 1028 such as a disk drive or other mass storage device which may include instructions/code and data 1030, in one embodiment. Further, an audio I/O 1024 may be coupled to the second bus 1020. Note that other architectures are possible. For example, instead of the point-to-point architecture of FIG. 10, a system may implement a multi-drop bus or other such architecture.

Figure 11:
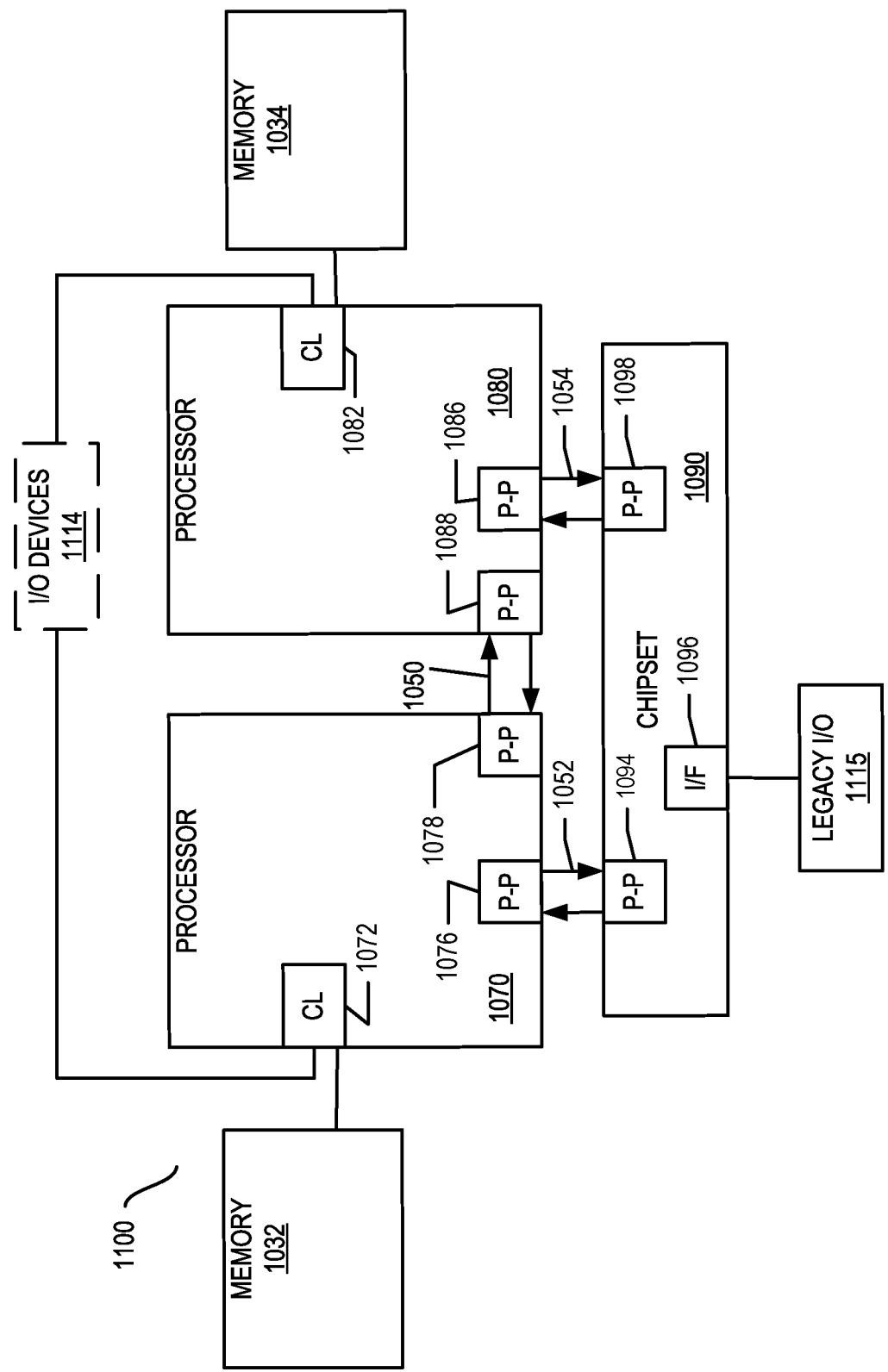
FIG. 11 illustrates a block diagram of a third system in accordance with an embodiment of the present invention.

Referring now to FIG. 11, shown is a block diagram of a second more specific exemplary system 1100 in accordance with an embodiment of the present invention. Like elements in FIGS. 10 and 11 bear like reference numerals, and certain aspects of FIG. 10 have been omitted from FIG. 11 in order to avoid obscuring other aspects of FIG. 11.

FIG. 11 illustrates that the processors 1070, 1080 may include integrated memory and I/O control logic ("CL") 1072 and 1082, respectively. Thus, the CL 1072, 1082 include integrated memory controller hardware and include I/O control logic. FIG. 11 illustrates that not only are the memories 1032, 1034 coupled to the CL 1072, 1082, but also that I/O devices 1114 are also coupled to the control logic 1072, 1082. Legacy I/O devices 1115 are coupled to the chipset 1090.

Figure 12:
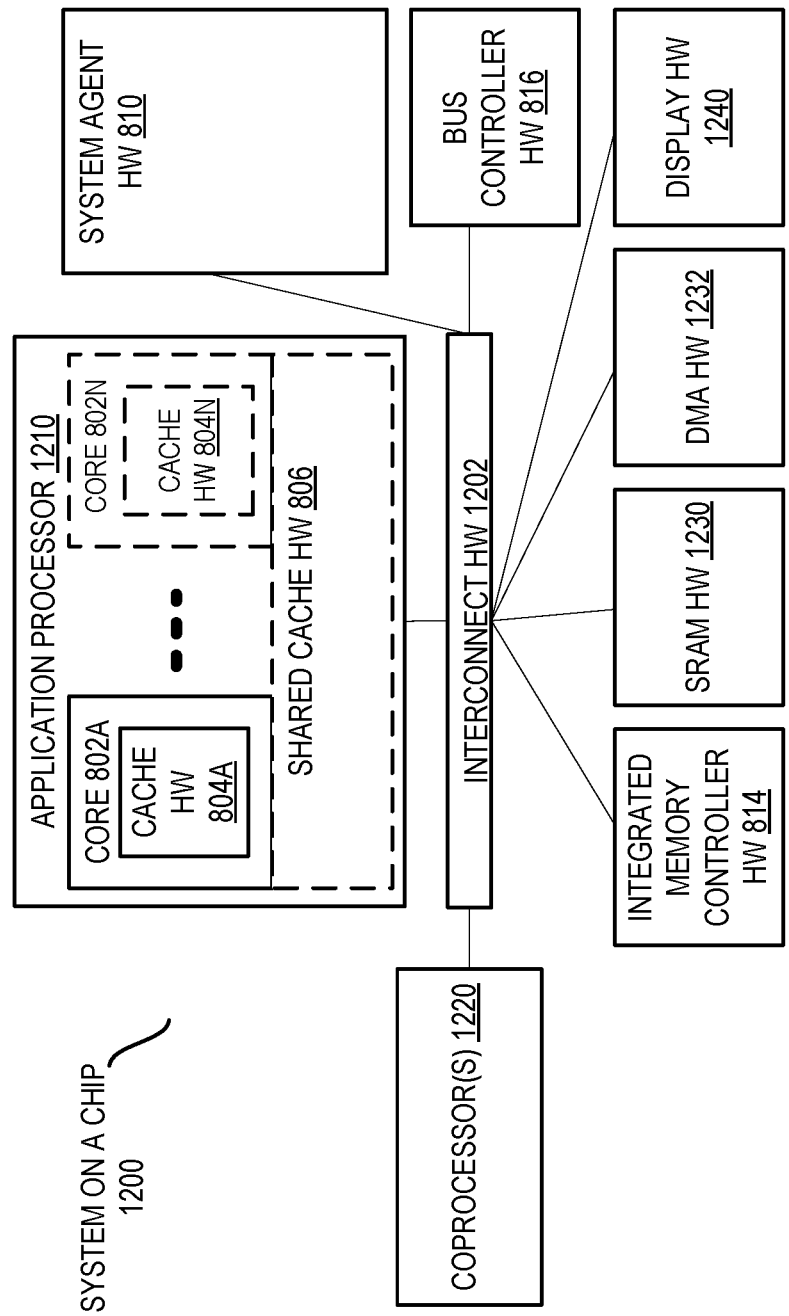
FIG. 12 illustrates a block diagram of a system on a chip (SoC) in accordance with an embodiment of the present invention.

Referring now to FIG. 12, shown is a block diagram of a SoC 1200 in accordance with an embodiment of the present invention. Similar elements in FIG. 8 bear like reference numerals. Also, dashed lined boxes are optional features on more advanced SoCs. In FIG. 12, an interconnect hardware 1202 is coupled to: an application processor 1210 which includes a set of one or more cores 802A-N and shared cache hardware 806; a system agent hardware 810; a bus controller hardware 816; an integrated memory controller hardware 814; a set or one or more coprocessors 1220 which may include integrated graphics logic, an image processor, an audio processor, and a video processor; an static random access memory (SRAM) hardware 1230; a direct memory access (DMA) hardware 1232; and a display hardware 1240 for coupling to one or more external displays. In one embodiment, the coprocessor(s) 1220 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1030 illustrated in FIG. 10, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 13 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1304 represents a compiler that is operable to generate x86 binary code 1306 (e.g., object code) that can, with or without additional linkage processing, be executed on the processor with at least one x86 instruction set core 1316. Similarly, FIG. 13 shows the program in the high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, CA and/or that execute the ARM instruction set of ARM Holdings of Sunnyvale, CA). The instruction converter 1312 is used to convert the x86 binary code 1306 into code that may be natively executed by the processor without an x86 instruction set core 1314. This converted code is not likely to be the same as the alternative instruction set binary code 1310 because an instruction converter capable of this is difficult to make; however, the converted code will accomplish the general operation and be made up of instructions from the alternative instruction set. Thus, the instruction converter 1312 represents software, firmware, hardware, or a combination thereof that, through emulation, simulation or any other process, allows a processor or other electronic device that does not have an x86 instruction set processor or core to execute the x86 binary code 1306.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

The invention claimed is:

1. An apparatus comprising:
a micro-operation (uop) buffer circuitry to identify a function for memorization based on retiring uops from a processing pipeline, the function associated with a function block of a plurality of uops;
memorization retirement buffer circuitry to generate a signature of the function, the signature comprising input and output data of the function and an ordered sequence of the plurality of uops in the function block;
a memorization data structure to store in an entry the signature associated with the function; and
predictor circuitry to detect an instance of the function to be executed by the processing pipeline and responsively exclude a first subset of uops associated with the instance from execution when a confidence level associated with the function is above a threshold,
wherein one or more instructions that are data-dependent on execution of the instance is provided with the output data of the function from the memorization data structure.

2. The apparatus of claim 1, wherein the uop buffer circuitry is coupled to a re-order buffer (ROB) of the processing pipeline to store the retiring uops.

3. The apparatus of claim 2, wherein the ROB is associated with a retirement width and the uop buffer circuitry comprises a storage structure that is sized at twice the retirement width of the ROB.

4. The apparatus of claim 3, wherein the uop buffer circuitry is to track occurrences of a call uop in the storage structure to identify the function for memorization.

5. The apparatus of claim 1, wherein the function is excluded from memorization when the function contains a system call or a floating-point calculation.

6. The apparatus of claim 1, wherein a second subset of the uops of the instance remains in the processing pipeline for execution.

7. The apparatus of claim 6, wherein the second subset comprises store uops and/or global load uops.

8. The apparatus of claim 1, wherein the predictor circuitry is further to insert a dummy uop in the processing pipeline in place of the first subset of the plurality of uops excluded from the processing pipeline, the dummy uop usable to collect input and output values associated with the instance, the input and output values usable for validating memorization of the instance.

9. The apparatus of claim 8, further comprising a validation circuitry to validate the input and output values collected by the dummy uop against the input and output data of the function stored in the memorization data structure.

10. The apparatus of claim 9, wherein the dummy uop comprises a memorization data structure identifier for locating the entry in the memorization data structure.

11. The apparatus of claim 9, wherein responsive to a positive validation by the validation circuitry, the dummy uop is removed from the processing pipeline and a confidence level of the instance tracked by the predictor circuitry is incremented.

12. The apparatus of claim 9, wherein responsive to a negative validation by the validation circuitry, the instance of the function is re-inserted into the processing pipeline for execution.

13. The apparatus of claim 1, wherein the input and output data of the function comprise registers and/or memory locations accessed by uops in the function block associated with the function.

14. A method comprising:
identifying a function for memorization based on retiring micro-operations (uops) from a processing pipeline, the function associated with a function block of a plurality of uops;

generating a signature of the function, the signature comprising input and output data of the function and an ordered sequence of the plurality of uops in the function block;

storing in an entry the signature associated with the function in a memorization data structure; and detecting an instance of the function to be executed by the processing pipeline and responsively excluding a first subset of uops associated with the instance from execution when a confidence level associated with the function is above a threshold; and providing one or more instructions that are data-dependent on execution of the instance with the output data of the function from the memorization data structure.

15. The method of claim 14, further comprises storing the retiring uops in a uop buffer which is coupled to a re-order buffer (ROB) of the processing pipeline.

16. The method of claim 15, wherein the ROB is associated with a retirement width and the method further comprises sizing the uop buffer at twice the retirement width of the ROB.

17. The method of claim 15, further comprises tracking occurrences of a call uop in the uop buffer to identify the function for memorization.

18. The method of claim 14, further comprises excluding the function from memorization when the function contains a system call or a floating-point calculation.

19. The method of claim 14, further comprises leaving a second subset of the uops of the instance in the processing pipeline for execution.

20. The method of claim 19, wherein the second subset comprises store uops and/or global load uops.

21. The method of claim 14, further comprises inserting a dummy uop in the processing pipeline in place of the first subset of the plurality of uops excluded from the processing pipeline, the dummy uop usable to collect input and output values associated with the instance, the input and output values usable for validating memorization of the instance.

22. The method of claim 21, further comprises validating the input and output values collected by the dummy uop against the input and output data of the function stored in the memorization data structure.

23. The method of claim 22, further comprises using a memorization data structure identifier in the dummy uop to locate the entry in the memorization data structure.

24. The method of claim 22, further comprises removing the dummy uop from the processing pipeline and incrementing a confidence level of the instance responsive to a positive validation.

25. The method of claim 22, further comprises re-inserting the instance of the function into the processing pipeline for execution responsive to a negative validation.

* * * * *